(12) United States Patent
Hall

(10) Patent No.: US 7,653,997 B2
(45) Date of Patent: Feb. 2, 2010

(54) FRICTION LINEAR GUIDE RAIL ASSEMBLY FOR BOILER TUBE CUTTING APPARATUS

(75) Inventor: J. Randall Hall, Wadsworth, OH (US)

(73) Assignee: H&S Tool, Inc., Wadsworth, OH (US)

( * ) Notice: Subject to any disclaimer, the term of this patent is extended or adjusted under 35 U.S.C. 154(b) by 0 days.

(21) Appl. No.: 12/075,782

(22) Filed: Mar. 13, 2008

(65) Prior Publication Data

US 2008/0156158 A1 Jul. 3, 2008

Related U.S. Application Data

(62) Division of application No. 10/999,497, filed on Nov. 30, 2004.

(60) Provisional application No. 60/526,524, filed on Dec. 3, 2003.

(51) Int. Cl.
*B23P 6/00* (2006.01)
*B23D 45/12* (2006.01)

(52) U.S. Cl. .................. 29/890.031; 83/745; 83/487

(58) Field of Classification Search ............ 29/890.031; 83/498, 499, 504, 508.2, 823–829, 821, 745, 83/574, 699.11, 487–489
See application file for complete search history.

(56) References Cited

U.S. PATENT DOCUMENTS

| 3,186,282 | A | | 6/1965 | Waterhouse |
| 4,633,555 | A | | 1/1987 | Legge |
| 4,718,201 | A | * | 1/1988 | Legge ..................... 83/745 |
| 4,739,688 | A | | 4/1988 | Brennan et al. |
| 4,775,247 | A | | 10/1988 | Isert |
| 4,830,551 | A | | 5/1989 | Brennan et al. |
| 4,872,249 | A | | 10/1989 | VanderPol et al. |
| 5,033,347 | A | | 7/1991 | Hillestad et al. |
| 5,044,075 | A | | 9/1991 | Brennan et al. |
| 5,199,221 | A | | 4/1993 | Hillestad |
| 5,356,248 | A | | 10/1994 | Hillestad |
| 5,542,177 | A | * | 8/1996 | Hillestad ............. 29/890.03 |
| 5,582,538 | A | | 12/1996 | Hillestad |

* cited by examiner

*Primary Examiner*—Stephen Choi
(74) *Attorney, Agent, or Firm*—Hudak, Shunk & Farine Co. LPA

(57) ABSTRACT

The present invention relates to a guide rail assembly for securement of a tube cutting apparatus for cutting of boiler tube walls to a fixed point on a tube wall, while allowing lateral repositioning of a cutting tool relative to the tube wall. The assembly includes a guide rail having a convex surface along which a carriage having a cutting device may be fixedly positioned by mating friction engagement of a concave surface of pairs of linear guide blocks secured to the carriage with the convex surface of the guide rail.

21 Claims, 3 Drawing Sheets

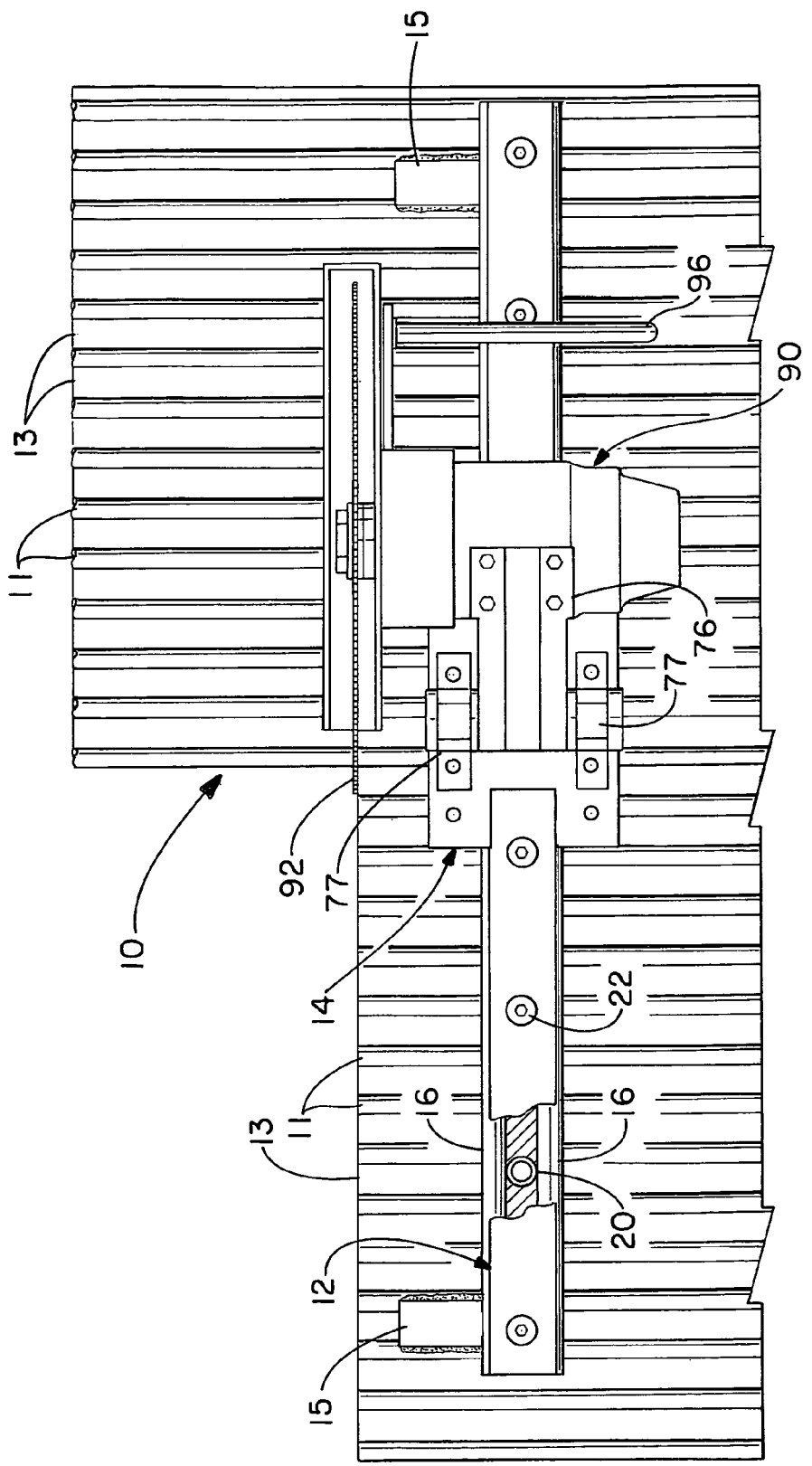

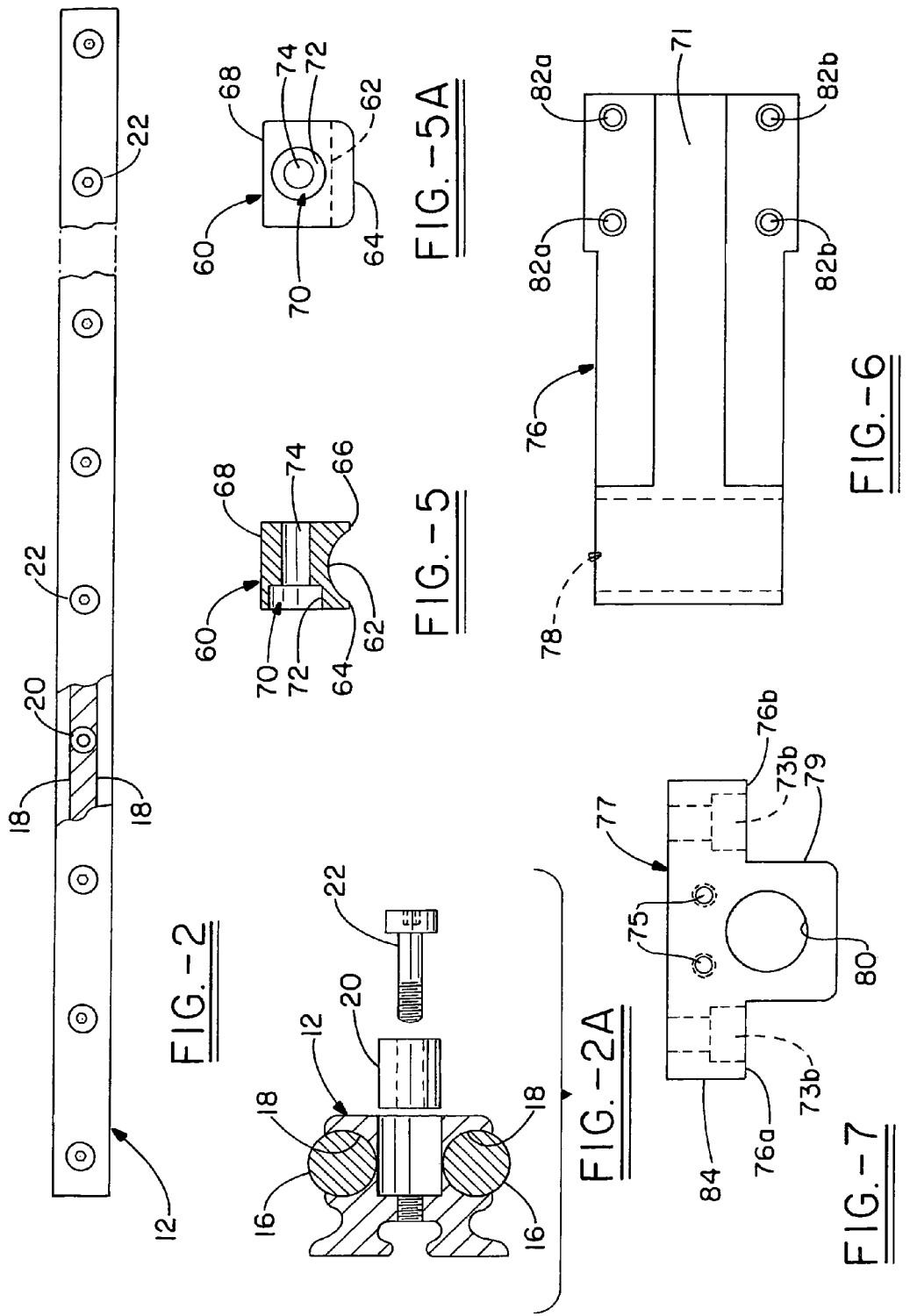

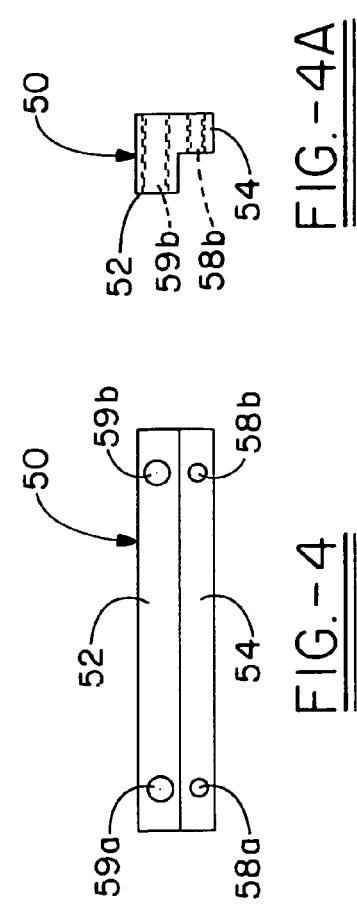
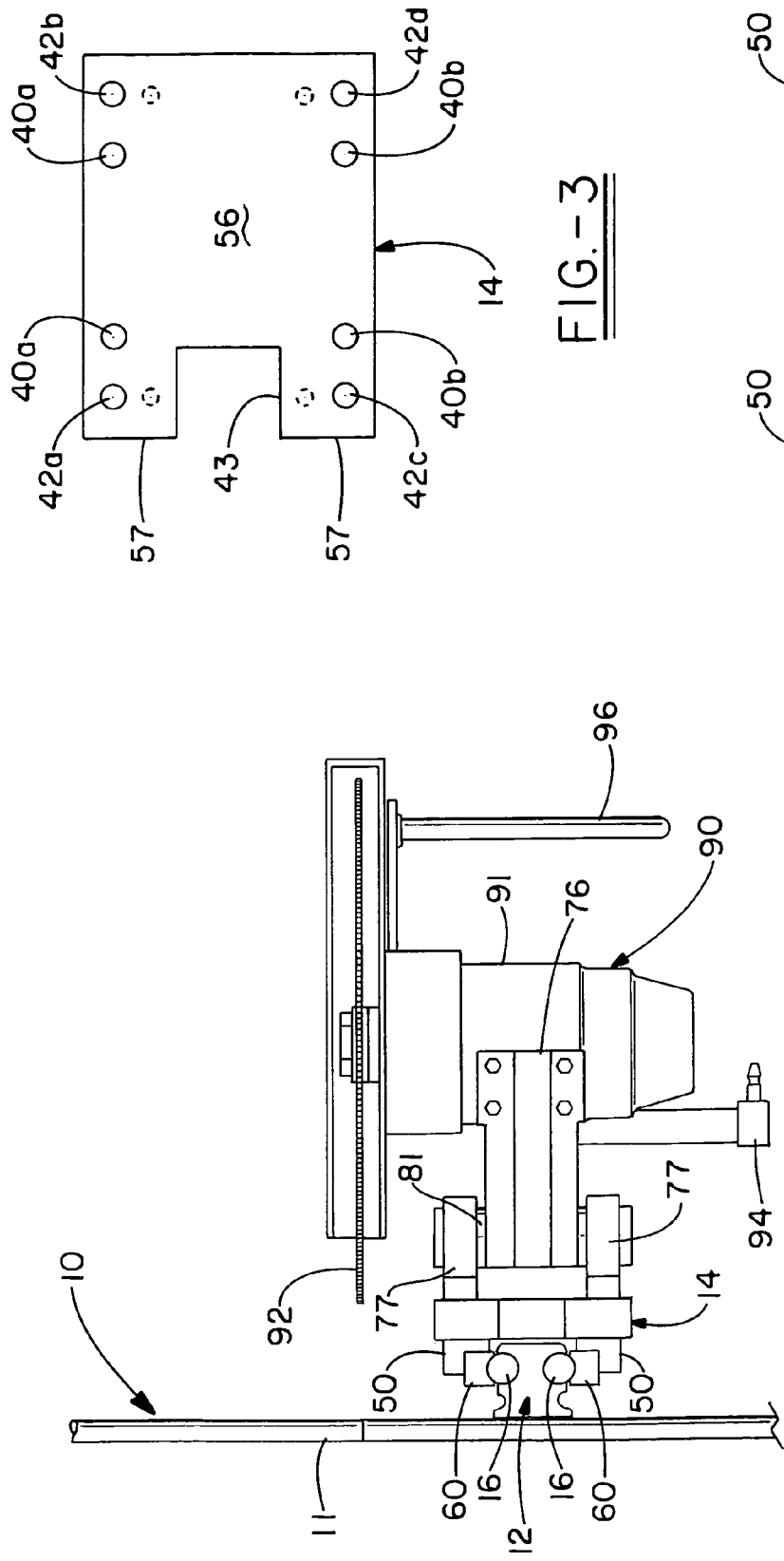

_US 7,653,997 B2_

FRICTION LINEAR GUIDE RAIL ASSEMBLY FOR BOILER TUBE CUTTING APPARATUS

CROSS REFERENCE

This application claims the benefit of priority under 35 U.S.C. § 119 of U.S. Provisional Application Ser. No. 60/526,524 filed on Dec. 3, 2003.

FIELD OF THE INVENTION

The invention is directed to an apparatus for cutting boiler tube walls such as are common at power generating stations. More specifically, the present invention relates to an assembly for securing a cutting device in order to perform a cutting operation on a tube wall section. In a preferred embodiment, the cutting device can be releasably secured at various portions along a fixed plane perpendicular to the axial direction of the tubes of the tube wall.

BACKGROUND OF THE INVENTION

Power generating or other plants circulate fluids, such as water or steam, through tubes or banks of tubes. The fluid is often heated and used, for example, to drive turbines which generate electricity.

The tubes are generally arranged in large panels or banks of parallel tubes which are connected together with a metal membrane or web continuously interposed between each pair of adjacent tubes in the bank to form a tube wall. The tubes generally have an outer diameter which can range from about 1 inch up to about 3 inches, with a wall thickness which can be up to about 0.5 inch. On account of deterioration due to corrosion and the like, the tubes occasionally require replacement. Ordinarily, repair of damaged or worn tubing involves cutting and removal of relatively large sections of the tube banks, and replacement with a new panel of tubes. The bank sections are generally replaced in large rectangular sections typically having sizes ranging from a few feet to 10, 20, 100 or even 200 feet in length.

Tube wall sections are generally removed by using either hand held tools such as motor driven saws or cutting torches, or more desirably by using various track mounted cutting apparatuses.

A portable tube cutting apparatus having a vice-like fastener for supporting the apparatus from a stationary object, such as the tube which is to be cut, is disclosed in U.S. Pat. No. 5,199,221. The disclosed apparatus can be used to cut the tube which supports the apparatus as well as other adjacent tubes in close proximity.

A track mounted cutting apparatus is disclosed in U.S. Pat. No. 5,582,538. The portable tube cutting apparatus which facilitates smooth, even cuts through a boiler tube wall includes a frame supporting a movable carriage adapted for movement in a linear direction relative to a frame which has articulated support means for securing the device to a boiler tube wall.

These prior art devices have utilized various means for securement of the carriage against the boiler tube wall to prevent lateral movement of the cutting apparatus once the position at which cutting will proceed has been achieved. The devices have an inherent drawback, however, in that they require some form of brake mechanism in addition to the other components of the pipe cutting assembly.

It would, therefore, be desirable to provide a securement mechanism which prevents the lateral movement of a pipe cutting assembly along a tube wall without the necessity of additional mechanical brake components to the apparatus.

SUMMARY OF THE INVENTION

The present invention provides a friction guide rail assembly for securement of a pipe cutting assembly to a fixed point on a tube wall while allowing lateral repositioning of the cutting device relative to the tube wall. The assembly includes a double guide rail having a convex surface along which a carriage having a cutting device may be fixedly positioned by mating engagement of a concave surface of the carriage with the convex surface of the guide rail.

BRIEF DESCRIPTION OF THE DRAWINGS

The preferred embodiment of the invention, illustrative of the best mode which applicants have contemplated, is set forth in the following description and is shown in the drawings and is particularly and distinctly pointed out and set forth in the appended claims.

FIG. 1 is a front elevational view of a linear guide rail assembly in accordance with the present invention connected to a wall of a tube bank.

FIG. 2 is a reduced front elevational view of a linear guide rail with a portion broken away to better show parallel guide channels formed in the rail.

FIG. 2A is an exploded end view, in cross-section, showing the elements which comprise an operational linear guide rail.

FIG. 3 is a front elevational view of a carriage base member as may be applied to position a tool with respect to the linear guide rail for operation therewith.

FIG. 4 is an elevational view of a support bar, a pair of which are mounted to the back surface of the carriage base member shown in FIG. 3.

FIG. 4A is a right end elevational view of the support bar shown in FIG. 4.

FIG. 5 is an elevational view, in cross-section, of a guide block member at least four of which are carried by the pair of support bars.

FIG. 5A is a left end elevational view of the guide block member shown in FIG. 5.

FIG. 6 is an elevational view of a hinge bracket which provides attachment of a tool to the carriage base member via a hinge lug and hinge pin for horizontal rotational motion of the tool, the hinge lug and pin being shown in FIGS. 1 and 8.

FIG. 7 is a top view of a hinge lug which mounts a hinge pin to the bracket shown in FIG. 6.

FIG. 8 is an end elevational view as may be taken from a left end vantage with respect to FIG. 1.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal", "vertical", "up", "down", "top", and "bottom" as well as derivatives thereof (e.g., "horizontally", "downwardly", "upwardly", etc.) should be construed to refer to the orientation as then described or as shown in the drawing figure under discussion. These relative terms are for convenience of description and are not intended to require a particular orientation unless specifically stated as such.

The friction linear guide rail assembly of the present invention is generally metallic, and useful metals include, but are not limited to, steel, nickel, stainless steel, and aluminum, as well as valve metals, including titanium, tantalum, zirconium and niobium, or combinations thereof. The guide rail 12 and guide blocks 60, as well as the support bar 50 and hinge bracket 76, will most always be heat treated steel, while it is preferred that the carriage base 14 be aluminum. As well as the normally available elemental metals themselves, the suitable metals of the guide rail 12 and linear guide blocks 60 can include metal alloys and intermetallic mixtures which are capable of resisting wear. For example, steel may be alloyed with nickel, cobalt, iron, manganese or copper. Plastic materials, preferably thermoset materials, can alternatively be utilized in some embodiments, if desired.

There is shown in FIG. 1 a portion of a bank of boiler tubes 10 that includes a preferably rectangular panel of tubes that is to be replaced. The boiler tube wall 10 is comprised of a row of parallel, typically vertically oriented tubes 11, each of which is continuously connected to an adjacent tube by a web or membrane 13. In some embodiments, the webbing may be absent. The tubes 11 and membranes 13 are generally formed separately of metal or alloy such as steel and then welded together. Repair of boiler tube walls generally involves cutting out a section of the tube wall which is worn or damaged, chamfering or beveling the tube ends which have been exposed by removal of the worn or damaged section of tube wall, and welding a new or replacement section of tube wall in place of the damaged section which has been removed. The damaged section of tube wall is usually removed by making two horizontally spaced cuts transverse to the longitudinal direction of the tubes 11 and two vertically spaced cuts, which together with the horizontal cuts defining a rectangular section which is to be replaced.

Mounted on the bank of tubes 10 is an elongated guide rail 12. The guide rail 12 is generally from about 3 feet to about 8 feet in length, and preferably about 6 feet. In some embodiments, multiple sections, i.e. two or more, of guide rails 12 are joined by a suitable rail coupler to enable cutting of longer sections of a tube wall. The horizontally arranged guide rail 12 is suitably secured to the tube bank 10 by means of weld tabs 15 which are connected preferably to a back side of the rail via welding or a fastener, etc. The weld tabs 15 preferably consist of a solid piece of metal, generally steel, measuring about ¼"×2"×7" which is tack welded to the boiler tube bank 10. The guide rail assembly 12 includes a carriage 14 which is supported on said guide rail 12 and movable along guide rail 12, generally in a horizontal or axial direction along the longitudinal axis of the guide rail 12. The carriage has a cutting device 90 operatively connected thereto and this allows for horizontal movement of the cutting device 90 relative to guide rail 12. The carriage 14 allows for rotational movement of the cutting device 90 relative thereto in a horizontal plane perpendicular to the axial direction of the tubes 10 in the tube bank.

As shown in FIG. 2, the guide rail 12 includes two parallel steel, preferably 12 mm diameter, rail shafts 16 (FIG. 2A) which are secured in extruded aluminum channels 18 of about 25 mm high. The shafts 16 project outwardly from the aluminum channels 18, thereby providing a surface, i.e. track, operatively connecting guide rail 12 to carriage assembly 14. The shape of the guide rail track is substantially convex as shown in FIG. 2A, owing to the profile of rail shaft 16. Additional track shapes can be used in other embodiments, such as square, triangular, oblong, etc. The shafts 16 are secured in parallel by steel spacers 20 inserted into the extruded aluminum channels at a distance of about 50 mm along guide rail 12 and secured by mounting screws 22 to the channel. The spacers will generally be present in an amount of from about 20 to about 50 per rail section. The channel acts as a frame and holds the components together, with the opposing rails fixed substantially parallel to each other. Such a guide rail 12 is available commercially from Tusk Direct of Bethel, Conn.

The carriage 14 (FIG. 3) includes an essentially square base 56 and a pair of depending side members 57 which are laterally disposed adjacent opposite sides of guide rail 12 and form a U-shaped notch 43 at one end of carriage base 56. Carriage base 56 includes two pairs of internally threaded cylindrical bores 40a, 40b which align with bores 73a, 73b of hinge lug 77 (FIG. 7) and accept means for attachment of hinge lug 77 to carriage base 56. Such attachment means can include socket head cap screws, bolts and the like.

A hinge lug 77 is depicted in FIG. 7. Hinge lug 77 includes a neck portion 79 which extends downwardly to shoulders 76a, 76b and a substantially flat base 84 which is connected to carriage base 56 as shown in FIG. 8. Hinge lug 77 includes a cylindrical bore aperture 80 and openings 73a, 73b. Hinge lug is preferably secured to carriage 14 by socket head cap screws as previously described. Openings 75 accept means for securement, including pins, screws, or bolts, and the like, of lug bolt in place in cylindrical bore 78.

Extending from carriage 14 is a hinge bracket 76 (FIG. 6) which is operatively and moveably mounted to carriage 14 through a lug bolt 81 connected between hinge lugs 77 (FIG. 7). The hinge bracket 76 rotates axially around the center portion of bore aperture 80 to produce a desired cutting motion with the cutting device 90 as described herein. Extending along a length of hinge bracket 76 is a raised rib 71 which cooperates with U-shaped notch 43 of carriage base 56 to allow for forward movement and thus greater range of motion of hinge bracket 76 toward guide rail 12. Bracket 76 further includes a cylindrical bore 78 which aligns with aperture 80 of hinge lug 77. The lug bolt passes through cylindrical bore aperture 80 and cylindrical bore 78 to operatively secure hinge bracket 76 to hinge lug 77 to carriage 14. On end opposite cylindrical bore 78, bracket 76 comprises a cutting device connecting element, preferably two pairs of screw apertures 82a, 82b for securing the cutting device 90 comprising a pneumatic motor 91 with pneumatic connector 94, handle 96, and cutting blade 92, generally a circular chop saw, thereon.

In FIG. 4 there is shown support bar 50. The support bar 50 is essentially L-shaped, having a top portion 52 which extends a greater width than bottom portion 54 with respect to an axis perpendicular to the longitudinal axis of bar 50, as shown in FIG. 4a. Support bar top 52 and side 54 includes apertures 59a, 59b, and 58a, 58b, respectively. Two support bars 50 are provided such that support bar 50 is mounted to each upper and lower portion of carriage base 56 of carriage 14 as shown in FIG. 8. Each support bar 50 is mounted to carriage base 56 by alignment of apertures 42a, b, c, d of carriage base 56 with apertures 58a, 58b of support bar 50. Upper support bar 50 of carriage 14 which is disposed on upper edge of guide rail 12 is preferably fixed in place, while lower support bar 50 is disposed on lower edge of guide rail 12 and is preferably vertically adjustable such as by using a slotted connection in relation to carriage base 56 and thus guide rail 12, in order to allow for adjustment of engagement of linear guide block 60 with a respective guide rail shaft 16.

The carriage 14 is provided with a plurality of guide blocks 60 (FIG. 3) which are adapted to engage the upper and lower edges of guide rail 12 along the rail shafts 16 to allow for movement of the carriage 14 along the guide rail 12. Thus, the carriage assembly 14 is free of wheels or other rotating means, and instead glides or slides along the guide rail 12 in a non-cutting position.

Referring to FIG. 5, the linear guide blocks 60 are generally spool-shaped and include an inner concave waist 62 which extends outwardly to a first flange 64 and a second flange 66, with the waist 62 extending around three sides of the first 64 and second 66 flanges and terminating in a flat top 68. Aperture 70 extends through first 64 and second 66 flanges. Aperture 70 (FIG. 5a) comprises an outer diameter 72 and a smaller inner diameter 74. Linear guide blocks 60 are fastened to side members 57 of carriage base 56 through support bar 50, preferably by means of socket head cap screws received in aperture 70 which then thread into support bar 50 at apertures 59a, 59b.

In FIG. 8 there is shown the linear guide rail assembly 90 with guide rail 12, carriage 14 and hinge bracket 76. In operation, carriage 14 is mounted on rail 12 by sliding linear guide blocks 60 onto rail shafts 16 from one end of the rail. Guide blocks 60 and waists 62 slidably move, preferably in a horizontal direction, along rail shaft 16 in a movement position with cutting device being supported and exerting little or no downward pressure on bracket 76 or carriage 14.

The carriage 14 can be locked in a cutting position to perform a cutting operation with the cutting device. In a first step, the carriage 14 is moved to a desired location along guide rail 12 with the cutting device 90 exerting substantially no force on the hinge bracket 76 or carriage 14. At the desired cutting location, the source of support for the cutting device 90, such as through handle 96, and/or hinge bracket 76 is removed. The guide blocks 60 are thereby pressed firmly and securely against guide rail 12 due at least in part to the weight of the cutting device 90, especially the convex shafts 16 thereof, locking the carriage 14 in relation to the guide rail 12. The carriage 14 is locked such that the movement of the carriage 14 in a horizontal direction along the guide rail 12 is substantially prevented.

A cutting operation can then be performed using the cutting device 90. In one embodiment, a preferred cutting device 90 is a chop saw such as available from H&S Tool, Wadsworth, Ohio as Model TS400. With the carriage 14 locked in place by the weight of the cutting device 90, the motor thereof is activated. The cutting device 90 is then moved towards the tube bank 10. As the cutting device 90 is connected to hinge bracket 76, the cutting device 90 moves in a radial direction with respect to center point of bore aperture 80. The cutting device 90 is allowed to contact the tube bank 10 and cut the same to a predetermined depth, preferably completely through at least one portion of the tube bank 10. Afterwards, the cutting device 90 is backed away from the tube bank 10 and deactivated for repositioning. The cutting device 90 and hinge bracket 76 are then lifted or supported to remove pressure from the guide blocks 60 and the carriage 14 is moved in a horizontal direction along guide rail 12 a predetermined distance to a second position where it is desired that a subsequent cut be placed in the tube bank 10. The operation is continued until the desired cuts have been placed in the tube bank 10.

Owing to the weight of the cutting device 90, which creates a cantilever effect, carriage 14 is held securely in place during a cutting operation by constant engagement of the inner concave waist 62 of the linear guide blocks 60 with the convex surface of the guide rail 12, thereby negating the necessity for an additional mechanical part or brake for braking or locking of the carriage 14 on the rail 12. The aperture of the present invention is free of a mechanical brake, such a brake comprising a shoe or pad, which locks the carriage to the guide rail 12. Thus, a friction fit between the shaft 16 of guide rail 12 and guide blocks 60 of the carriage 14 substantially prevents movement of the carriage 14 on the rail 12.

It is noted that the carriage assembly 14 with cutting device 90 will generally be pre-assembled as a single unit, excluding the guide rail 12, so that an operator need only slide the carriage assembly 14 onto the guide rail 12 in order to utilize the assembly to aid in a cutting operation.

While in accordance with the patent statutes the best mode and preferred embodiment have been set forth, the scope of the invention is not limited thereto, but rather by the scope of the attached claims.

What is claimed is:

1. A method for performing a cutting operation on a tube bank, comprising the steps of:
   connecting a guide rail to a section of a tube bank adjacent an area of the tube bank to be cut;
   operatively mounting a carriage assembly on the guide rail;
   connecting a cutting device to a hinge bracket of the carriage assembly, wherein the hinge bracket is rotatable in relation to an axis;
   moving the carriage assembly to a first position on the guide rail while an operator supports weight of the cutting device;
   removing operator support from the cutting device and forming a friction fit in a second position between a surface of the guide rail and a surface of the carriage assembly with the weight of the cutting device which substantially prevents linear movement of the carriage assembly on the guide rail; and
   performing a cutting operation on a portion of the tube bank with the cutting device whereby a cutting motion is produced with the cutting device by rotating the hinge bracket in relation to said axis while the friction fit is present between the surface of the guide rail and the surface of the carriage assembly.

2. The method according to claim 1, wherein the carriage assembly is free of a mechanical brake comprising a shoe or pad.

3. The method according to claim 2, wherein the guide rail guide surface has a convex shape, wherein the carriage assembly has a guide block and the guide block has a concave surface which form the friction fit with the guide rail guide surface in the second position, and wherein said moving the carriage assembly consists of sliding the guide block of the carriage assembly along the guide rail guide surface.

4. The method according to claim 3, wherein the carriage assembly includes at least one guide block disposed above and at least one guide block disposed below the guide rail for guiding the carriage assembly along the guide rail.

5. The method according to claim 4, further comprising the step of the operator supporting the cutting device to release the friction fit between the guide rail and carriage assembly, and the operator moving the carriage assembly by sliding the guide blocks along the guide rail guide surface to a further position on the guide rail.

6. The method according to claim 4, wherein two upper and two lower guide blocks are utilized.

7. The method according to claim 1, wherein the guide rail guide surface has a convex shape, wherein the carriage assembly has a guide block and the guide block has a concave surface which form said friction fit with the guide rail guide surface in the second position, and wherein said moving the carriage assembly consists of sliding the guide block of the carriage assembly along the guide rail guide surface.

8. The method according to claim 1, wherein the guide rail comprises a first elongated rail shaft and a second elongated rail shaft fixed at a distance and being substantially parallel to each other along a longitudinal axis of the guide rail, wherein at least one guide block is fixed to the carriage assembly and engages the first rail shaft, and wherein in the first position, the weight of the cutting device is supported by the operator to reduce pressure on the guide blocks, the guide blocks are slidably movable along the first and second rail shafts, and in the second position with operator support removed from the cutting device, the friction fit is formed between the guide blocks and the respective rail shafts.

9. The method according to claim 8, wherein the at least one guide block engaging the first rail shaft has a surface having a shape complementary to a guide surface of the first rail shaft, and wherein the at least one guide block engaging the second rail shaft has a surface having a shape complementary to a guide surface of the second rail shaft.

10. The method according to claim 9, wherein the guide surfaces of the first rail shaft and second rail shaft each have a convex shape, and wherein the at least one guide block engaging the first rail shaft has a concave surface which forms the friction fit with the first rail shaft guide surface and the at least one guide block engaging the second rail shaft has a concave surface which forms the friction fit with the guide rail guide surface in the second position that fixedly connects the carriage assembly to the guide rail against linear movement.

11. The method according to claim 10, wherein said at least one guide block comprises two upper and two lower guide blocks.

12. The method according to claim 11, wherein the hinge bracket is mounted to the carriage through a lug bolt connected between hinge lugs connected to the carriage assembly.

13. The method according to claim 12, wherein the carriage is free of a brake comprising a shoe or pad that locks the carriage to the guide rail other than said guide blocks.

14. A method for performing a cutting operation on a tube bank, comprising the steps of:
connecting a guide rail to a section of a tube bank adjacent an area to be cut, wherein said at least one guide rail has at least one guide surface;
operatively mounting a carriage assembly on the guide rail, wherein the carriage assembly has at least one guide block with a surface having a shape complementary to the at least one guide rail guide surface, said at least one guide block fixed to the carriage assembly;
connecting a cutting device to a hinge bracket of the carriage assembly, wherein the hinge bracket is rotatable in relation to an axis;
moving the carriage assembly to a first position on the guide rail while an operator supports weight of the cutting device by slidably moving the guide block along the guide rail guide surface;
removing operator support from the cutting device to form a friction fit in a second position between the guide surface and the guide block in a second position with the weight of the cutting device which substantially prevents linear movement of the carriage assembly along the guide rail with the guide block and guide rail guide surface being securely engaged with each other; and
performing a cutting operation on a portion of the tube bank with the cutting device whereby a cutting motion is produced with the cutting device by rotating the hinge bracket in relation to said axis while the friction fit is present due to the weight of the cutting device.

15. The method according to claim 14, wherein a first end of the hinge bracket is operatively connected to a base of the carriage assembly, wherein a second end portion of the hinge bracket is connected to the cutting device, and wherein the second end portion is capable of moving in a radial direction with respect to the first end.

16. The method according to claim 15, wherein the at least one guide rail guide surface has a convex shape and wherein the at least one guide block has a concave surface which forms the friction fit with the at least one guide rail guide surface in the second position that fixedly connects the carriage assembly to the guide rail against linear movement along the longitudinal axis of the at least one guide surface.

17. The method according to claim 16, wherein the carriage assembly includes said at least one guide block disposed both above the guide rail and said at least one guide block disposed below the guide rail for guiding the carriage assembly along the guide rail.

18. The method according to claim 17, wherein said at least one guide block comprises two upper and two lower guide blocks.

19. A method for performing a cutting operation on a tube bank, comprising the steps of:
connecting a guide rail to a section of a tube bank, the guide rail having a longitudinal axis and two rail shafts secured in parallel along the longitudinal axis in channels of the guide rail, the shafts providing a guide rail track having upper and lower substantially convex surfaces;
operatively mounting a carriage assembly on the guide rail, the carriage assembly comprising a base, a first support bar mounted on an upper portion of the base, a second support bar mounted on a lower portion of the base, at least one guide block fixedly connected to the first support bar and at least one guide block fixedly connected to the second support bar, wherein the guide blocks each have an inner concave waist located between flanges, and wherein the inner concave waist of the guide block connected to the first support bar is selectively engagable within the upper convex surface of the rail shaft and the inner concave waist of the guide block connected to the second support bar is selectively engagable with the lower convex surface of the rail shaft so that the carriage is locked in relation to the guide rail;
connecting a cutting device to a hinge bracket of the carriage assembly, wherein the hinge bracket is rotatable in relation to an axis;
moving the carriage assembly to a first position on the guide rail while an operator supports weight of the cutting device;
removing operator support from the cutting device to form a friction fit in a second position between a surface of the guide rail and a surface of the carriage assembly with the weight of the cutting device which substantially prevents linear movement of the carriage assembly on the guide rail; and
performing a cutting operation on a portion of the tube bank with the cutting device whereby a cutting motion is produced with the cutting device by rotating the hinge bracket in relation to said axis.

20. The method according to claim 19, wherein the hinge bracket is mounted to the carriage through a lug bolt connected between hinge lugs connected to the carriage base, and wherein the cutting device is movable in a horizontal plane in relation to the carriage.

21. The method according to claim 19, wherein two guide blocks are connected to the first support bar, and wherein two guide blocks are connected to the second support bar and each selectively engagable with the convex surfaces of the rail shaft.

* * * * *